June 20, 1944.  L. SEBESTYÉN  2,352,024
ANTI-OSCILLATION SUSPENSION FOR BEDS AND THE LIKE
Filed Dec. 11, 1940  2 Sheets-Sheet 1
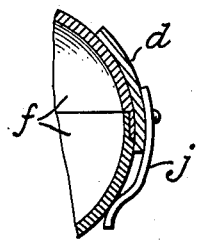
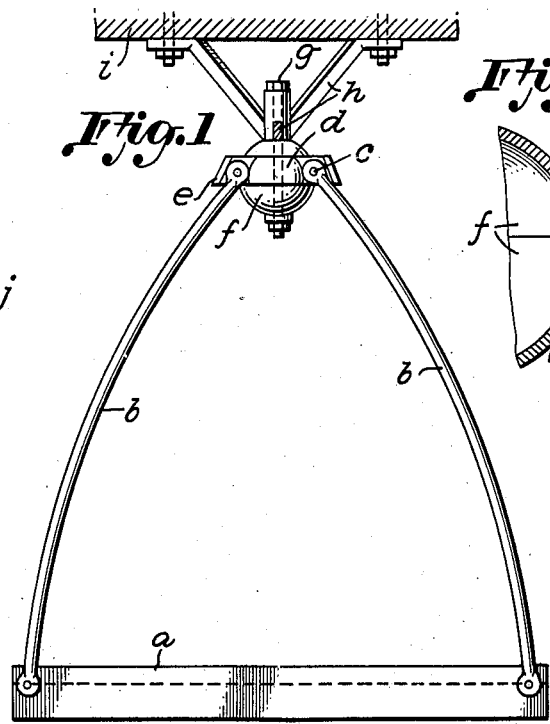
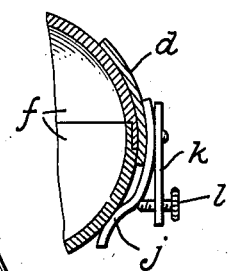
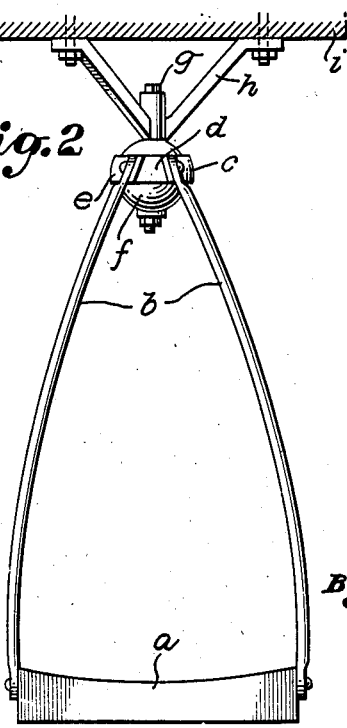
Inventor:
LÁSZLÓ SEBESTYÉN
By
Attorney.

June 20, 1944.　　　　L. SEBESTYÉN　　　　2,352,024
ANTI-OSCILLATION SUSPENSION FOR BEDS AND THE LIKE
Filed Dec. 11, 1940　　　2 Sheets-Sheet 2

Inventor:
LÁSZLÓ SEBESTYÉN

By　Al M Holcombe

Attorney.

Patented June 20, 1944

2,352,024

UNITED STATES PATENT OFFICE 2,352,024

ANTIOSCILLATION SUSPENSION FOR BEDS AND THE LIKE

László Sebestyén, Budapest, Hungary; vested in the Alien Property Custodian

Application December 11, 1940, Serial No. 369,630
In Hungary May 8, 1939

3 Claims. (Cl. 114—193)

Many people are more or less sensitive towards the oscillating movements of sea ships and are therefore liable to become sea-sick.

The purpose of the invention is to provide an anti-oscillation suspension for beds and the like, which, employed on ships exposed to oscillating movement, will notwithstanding the oscillations of the ship, always remain in relative rest and will thus as a rule cause persons sensitive towards sea-sickness and spending considerable length of time on such beds etc. to be protected against sea-sickness or enable such persons as have already become sea-sick to find, whilst still on the ship, the rest necessary for recovery.

According to the invention this object is achieved by suspending the bed, chair, or similar piece of furniture intended to assure rest to its user on a single universal joint. One member of this joint is in solid connection with the ship and follows the motion of the latter, whilst its other member is fixed to the bed or the like, and remains immovable, in consequence of the weight of the loaded or non-loaded bed etc., independently of the oscillation of the ship. In order to ensure that the bed etc. displaced accidentally or inadvertently independently of the oscillation of the ship should shortly again come to rest, a suitable oscillation damper, effecting the damping of oscillations e. g. by means of friction, is inserted between the two members of the universal joint, the damping effect of the said oscillation damper being preferably adjustable.

On the accompanying drawings four variants of the piece of furniture, for example a bed, according to the invention, in which the universal joint is represented by a spherical joint, are represented diagrammatically.

Fig. 1 is a side elevation of the bed and of its suspension.

Fig. 2 is a suitable end view. Here no oscillation damper is employed.

Fig. 3 is the section of a part of the spherical joint with oscillation-damping spring drawn to greater scale.

Fig. 4 is a section similar to Fig. 3, with oscillation-damping spring of adjustable strength.

Two cylindrical iron bars $b$ are fixed solidly to each longitudinal side of the bed $a$, Figs. 1 and 2, the upper ends of the said bars being fixed by means of the rivets $c$ to four extensions $e$ welded to the joint ring $d$. All the fixing devices of the suspension riggings are, accordingly, rigid. The ring $d$ is in close contact with the hollow joint sphere $f$ and is capable of gliding on the latter in any direction. The sphere $f$ is composed of two hemispheres closely fitted to each other and held together by means of the screw $g$, and can be fixed by means of the three-arm bracket $h$, for instance to the roof $i$ of a room cabin or to some other suitable place of the ship. The members $f$—$h$ are following the oscillating motion of the ship, whereas the members $a$—$e$ are, owing to their own weight and owing to their possible load, remaining at rest, whilst the sphere $f$ is capable of being displaced by gliding in the ring $d$. The reclining surface $a$ of the bed has a vertical cross-section which is concave all over its length, in consequence whereof it compels the person lying in it to keep to the middle part of the bed and thus to refrain from altering the position as shown of the centre of gravity of the bed. Similarly, the seat surface of round chairs etc. may also be preferably made concave, notably in all vertical sections.

Fig. 3 represents a further variant in which the mutual displacement of the ring $d$ and of the sphere $f$ are braked by the plate spring $j$ fixed to the ring, the free end of the said spring becoming pressed against the sphere.

In the variant according to Fig. 4, the pressure of the spring against the sphere may be adjusted by means of a screw $l$ capable of being rotated in the rigid arm $k$ fixed to the ring.

The employment of such a damping device is—as mentioned above—advisable in order to ensure the rapid elimination of any oscillations caused by such forces as to which the bed may be subjected accidentally or by inadvertence. The amount of damping is of course chosen of such magnitude only as to prevent its affecting in any detrimental extent the displacement, produced by means of the oscillations of the ship, of the sphere $f$ in the ring $d$. The force effects due to inadvertence or to accidental causes referred to above, may arise, for instance, if somebody enters the bed $a$ or descends from it, or if a shock is imparted to the bed or if there is a draught, or if the travel speed of the ship varies suddenly.

Figure 5:
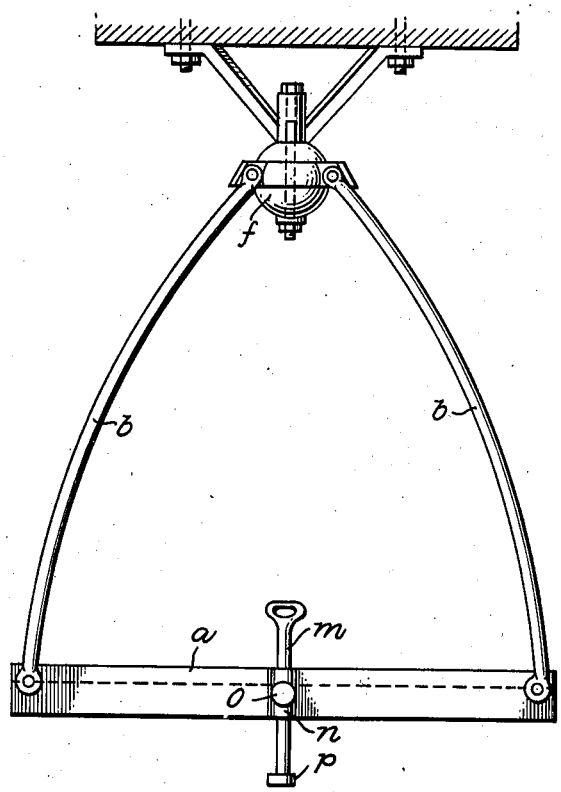
Fig. 5 is a side elevation similar to Fig. 1 of a further variant of a kind of bed etc. comprising two fixing bars capable of being supported on the floor.
Figure 6:
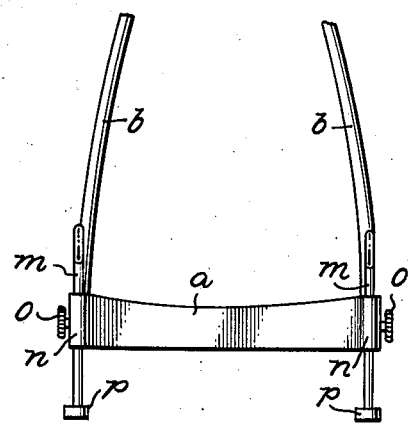
Fig. 6 is an end view belonging to Fig. 5.

In order to prevent the detrimental oscillations referred to, it is also possible to employ, instead of the damping device employed in connection with the sphere $f$, or in addition thereto, two lower supporting bars $m$ according to Figs. 5-6, each of which is movable upwards and downwards in a guide $n$ fixed to the bed $a$, and can be fixed in the desired position by means of the screw $o$. When the bed is being used, the bars $m$ are in the position illustrated and their lower ends are not in contact with the floor. When the person who has been occupying the bed leaves it, or at least when he again wishes to enter the bed, the bars $n$, after loosening the screws $o$ are let down in such an extent as to ensure that their lower end on which a rubber shoe $p$ is provided should reach down to the floor, following which the bars are again fixed by tightening the screws $o$. In this case the force effects accompanying the entrance of the person into the bed will not move the bed from its position of rest as this will be prevented by the shoes $p$ rubbing on the floor. After the person has entered the bed, the screws $o$ are loosened, the bars $m$ are drawn-up from the floor into the position shown and are again fixed in this position.

The new anti-oscillation bed or the like may of course be modified in many ways without leaving the range of the invention. Thus, for instance, it may be possible to vary the length of the suspension bars, and the suspension bars may be mutually connected by reinforcing crossbeams. The bed may also be suspended on a bracket fixed to the wall, or—e. g. on deck—it may be suspended on three or four supporting legs meeting in a common point above the bed. The joint sphere $f$ may also be relatively smaller than the one represented on the drawings and may also be solid and of one piece. The suspension bars $b$ may also be fixed to some other parts of the bed $a$, e. g. to the four corners of its top surface. In the case of the variant according to Figs. 5-6 the method of motion and fixing as well as the number of the supporting bars $m$ may also be different from those shown, thus for instance, these bars may be brought into their upper or lower position automatically by springs etc.

I claim:

1. In a self-adjusting suspension bed, having a bed and upwardly extending suspending members for the same, a globular element stationarily secured to a portion of the structure on which the bed is arranged, as a ship, a ring around said globular element having a globe section for its inner surface by which it is snugly, but slidingly, supported by said globular element, said bed suspending means being secured to said ring, and a resilient member secured on said ring, said resilient member having a portion projecting over and slidably pressing on said globular element to dampen oscillation of the ring on said element.

2. In a device as set forth in claim 1, a rigid arm secured to the ring and extending over the resilient member, and an adjustable regulating means between said rigid arm and said resilient member, whereby the pressure of said resilient member on said globular element may be adjusted.

3. In a device as set forth in claim 1, a rigid arm secured to said ring and extending over the resilient member, and an adjustable regulating means between the rigid arm and the resilient member, whereby the pressure of said resilient member on the globular element may be adjusted, said regulating means between the rigid arm and the resilient member comprising a screw passing through a threaded hole in the rigid arm, its free end engaging said resilient member.

LÁSZLÓ SEBESTYÉN.